United States Patent Office 2,956,087
Patented Oct. 11, 1960

2,956,087

DIMERIZATION OF VINYL AROMATIC COMPOUNDS

Charles E. Frank, Cincinnati, Ohio, and James S. Swinehart, Staten Island, N.Y., assignors to National Distillers and Chemical Corporation, New York, N.Y., a corporation of Virginia No Drawing. Filed Dec. 4, 1958, Ser. No. 778,056

10 Claims. (Cl. 260—670)

This invention relates to an improved process for coupling vinyl aromatic compounds and, more particularly, to a novel method for preparing coupled derivatives of such compounds by the reductive coupling reaction of a vinyl aromatic compound containing at least one vinyl group, such as, for example, styrene and ring substituted styrenes.

It is an object of this invention to provide a process for the preparation of dimers of vinyl aromatic hydrocarbons. A further object of this invention is to provide a process for the preparation of diarylbutanes by reductive dimerization or coupling of styrene and ring substituted styrenes. Other objectives and advantages of the invention will become apparent from the detailed description set forth below.

In U.S. Patents No. 2,773,092 and No. 2,816,916 processes are disclosed in which diolefins such as butadiene form dialkali metal dimers in the presence of a dispersed alkali metal in a suitable and selective reaction medium at temperatures below about 50° C., and preferably below about 0° C. and down to about —80° C. It has been described in U.S. Patent No. 2,816,913, that vinyl aromatic compounds will react with dispersed sodium or potassium in a suitable and selective solvent and in the presence of a relatively small amount of a polycyclic aromatic compound at a temperature below about 0° C. to form dialkali metal dimers.

It has been found that vinyl aromatic compounds will couple in the absence of other hydrocarbons and in the presence of at least an equimolar amount of certain ethers, but not necessarily the so-called "active" ethers, or other hydrogen-donor substrate and an alkali metal at temperatures above about 60° C. In this reaction, the coupled product from the vinyl aromatic compound is formed directly, as in the formation of polystyrene. It is an important feature of this invention that there is no intermedate formation of a dialkali metal derivative. This reaction is illustrated generally by the equation which follows:

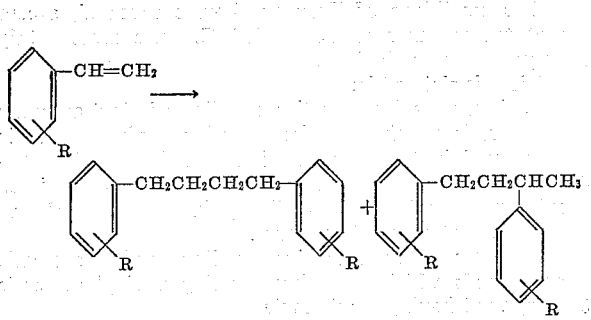

wherein R may be H, an aryl radical, or an alkyl radical. In general, the process of this invention can be considered to be a controlled polymerization which stops selectively at the dimer stage. The absence of intermediate dialkali metal derivatives is clearly indicated by the fact that carbonation of the reaction mixture gave no dibasic acid products. This was quite surprising and entirely unexpected in view of the past behavior and prior art in the field of vinyl aromatic chemistry.

The coupling of this invention is carried out, for example, by contacting a vinyl aromatic compound with an alkali metal in the presence of an ether diluent and agitating the mixture at a temperature above about 60° C. until the reaction has been substantially completed. After destruction of the unreacted alkali metal, if any, by the addition of water, alcohol, dilute hydrochloric acid, or the like, the immiscible layers which form are separated, and the coupled product is separated from the organic layer.

Any of the alkali metals or mixtures thereof may be used in the process, but sodium and potassium are preferred. Sodium is especially preferred, since it gives excellent selectivity and high yields of the dimerized products. In addition, it is cheaper and more readily available than the other alkali metals. Chemically pure sodium is not essential however, since mixtures containing a major proportion of sodium are also useful; thus, alloys of sodium with potassium, calcium, and the like may also be advantageously used. The alkali metal may be employed and introduced into the reaction in any desired form, but preferably, it is introduced in particulate form, for example, as small pellets, wire, or particles dispersed in a hydrocarbon medium. The preferred form is a dispersion in an ether of the alkali metal whose average particle size is less than about 50 microns, since reaction rates are considerably faster with this finely divided material. The dispersion is most conveniently made either in an ether or other inert organic dispersant, such as a hydrocarbon mineral spirits fraction, or an aromatic hydrocarbon such as benzene, toluene, xylene, or the like, and as a separate step prior to its contact with the vinyl aromatic compound which is to be subjected to coupling. The alkali metal is present preferably in at least an equimolar amount with the vinyl aromatic compound in order to prevent long polymer chains from forming and to maintain high yields of the desired coupled product. An excess of sodium will not be harmful to the reaction since the ether and products can be removed by distillation; the excess sodium residue can be used for the next reaction simply by adding additional ether and styrene to it.

The preferred reaction medium is an organic ether or other hydrogen-donor substrate boiling between about 60° C. and 200° C. and it should be present in at least an equimolar amount based on the vinyl aromatic compound. Examples of suitable reaction media which may be used in the process of the present invention are di-n-propyl ether; di-isopropyl ether; the dibutyl ethers; the diamyl ethers; the hexyl ethers; mixed ethers such as ethyl butyl ether, phenyl ethyl ether, propyl butyl ether and the like; tetrahydrofuran; the dimethyl ether of ethylene glycol; and the diethyl ether of diethylene glycol. Tetrahydrofuran, dioxane and the di-butyl ethers are particularly suitable. Ethers boiling below about 60° C., such as dimethyl ether, diethyl ether, methyl ethyl ether, methyl propyl ether, and the like, may be used but here the reaction is necessarily carried out under superatmospheric pressure so that operating temperatures are at least above 60° C.

The vinyl aromatic compounds which are useful for this reductive coupling process are styrene and substituted styrenes, for example, methyl styrene, ethyl styrene, and the like, in other words, an aromatic vinyl compound in which the vinyl group is attached to the ring. These compounds have the structural formula

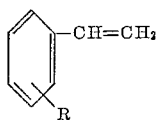

and R represents H, an aryl group, or an alkyl group having 1 to 12 carbon atoms. The mole ratio of the vinyl aromatic compound to the ether should not be greater than 1 to 1 and preferably should be in the range of 1 to 10. Concentrations above about 20 percent are undesirable since they generally lead to increased polymerization along with correspondingly lower yields of the desired products.

The reaction is generally carried out at a temperature in the range of about 60 to 200° C. with a preferred range of about 65° to 150° C.

The time required for the completion of the reductive coupling reaction is not critical and depends upon the particular vinyl aromatic compound used, the exact particulate form of the alkali metal, the ether used, the concentration of alkali metal and vinyl aromatic compound in the ether, and the reaction temperature.

The process embodied herein may be carried out in batchwise, semi-continuous, or continuous manner, and the invention is not intended to be limited to any particular method of operation.

The products so produced find use as intermediates for dyestuffs, surfactants, and oxidation inhibitors and are valuable in the preparation of polymers and copolymers, resins, and plasticizers. They may be subjected to further reactions, such as sulfonation, nitration, oxidation, halogenation, and so forth, to form further derivatives, such as diphenylbutadiene, 2,5-diphenylthiophene, 1-phenylnaphthalene, and the like.

The invention will be described in further detail by the following examples which are presented solely to illustrate but not to limit the invention in any manner except in accord with the appended claims. All parts are expressed by weight unless otherwise specified.

*Example 1*

A mixture of 47 parts of sodium in 280 parts of di-n-butyl ether was agitated at a temperature above the melting point of sodium to form a suspension of sodium sand. A solution of 23 parts of styrene in 285 parts of di-n-butyl ether was added to the suspension of sodium sand, and the resulting mixture was agitated at a temperature of about 140° C. for a period of 10.5 hours. The mixture was allowed to stand overnight, after which 200 parts of water was slowly added to it. The immiscible layers were then separated, and the butyl ether was removed from the organic layer by distilling under reduced pressure. A mixture of isomeric diphenylbutanes (7.4 parts) was obtained from the remaining oil by distilling it at a temperature between 150° and 180° C. at a reduced pressure of 2–4 mm. There remained 7.5 parts of trimeric styrenes boiling at 185°–255° C./2–4 mm. The diphenylbutane fraction solidified in part, and the solid was separated by filtration. The solid was recrystallized from a benzene-petroleum ether mixture, yielding 4.9 parts of 1,4-diphenylbutane which melted at 52.5° C.; a mixture of this material with a known sample of 1,4-diphenylbutane gave no depression in melting point. The oil that remained after removal of the solid had a refractive index of 1.5523 at 25° C. The refractive index of 1,3-diphenylbutane at 25° is 1.5525.

*Example 2*

A 50% sodium-xylene dispersion (100 parts) was suspended in 300 parts of tetrahydrofuran with agitation; the suspension was heated to reflux. A solution of 64 parts of styrene in 710 parts of tetrahydrofuran was added slowly over a period of 26 hours. After 8 hours, an additional 20 parts of small sodium pieces was added to the reaction mixture. Upon completion of the reaction, the sodium was decomposed by adding approximately 250 parts of 10% hydrochloric acid saturated with sodium chloride. The solid polymer was removed by filtration, and the water and tetrahydrofuran layers separated. After removal of the tetrahydrofuran, there remained 4.8 parts of 1,4-diphenylbutane boiling at 124°–130° C./5 mm. and melting at 52°–53° C.

*Example 3*

The heating of 41 parts of styrene with 40 parts of sodium wire in 830 parts of dioxane at 98° C. was carried out in substantially the same manner as the process described in Example 1. Sixteen parts of 1,4-diphenylbutane was obtained.

*Example 4*

This experiment was carried out to show that no dialkali metal dimers are present in the reaction mixture.

Styrene (0.22 mole) diluted with n-butyl ether (2.1 moles) was added to a hot mixture (112–137° C.) of n-butyl ether (2.1 moles) and sodium (2.2 g. atom) (as a 1–2 micron dispersion in mineral spirits at 25% sodium concentration). Monomer addition was completed in one hour, and the resulting mixture was stirred and heated at 140° C. for an additional two hours. When cooled, the reaction mixture was poured onto Dry Ice for carbonation.

During the entire reaction, the nitrogen purge system terminated in a Dry Ice trap held at −80° C. At the completion of the reaction this trap contained a colorless liquid which spectrometric and infra-red analyses indicate to be 1-butene probably resulting from cleavage of the butyl ether.

The aqueous layer, obtained by quenching the carbonated mixture, was acidified with hydrochloric acid. No acidic materials were obtained, thus showing the absence of any organosodium compounds in the reaction mixture which would undergo carbonation under the conditions of attempted reaction employed.

The organic layer was distilled under reduced pressure. A liquid fraction (17% of theory) was identified as 1,3-diphenylbutane. The distillation residue (49% of theory) was a brown solid which had a softening point of 38–42° C. and consisted of a mixture of 1,4-diphenylbutane and trimeric styrene.

The following experiments were carried out to show that the proper reaction media and the proper reaction temperatures are necessary to obtain the desired products in satisfactory yields.

*Example 5*

The conditions of Example 4 were repeated, except that mineral spirits were substituted for the n-butyl ether. Only polystyrene was obtained.

*Example 6*

The conditions of Example 4 were repeated, except that temperatures of 30 to 50° C. were used. Only polystyrene was obtained.

What is claimed is:

1. A process for reductive coupling of vinyl aromatic compounds which comprises reacting a vinyl aromatic compound in the presence of an alkali metal in a hydrogen-donor substrate at a temperature above 60° C., said substrate having a boiling point between 60° and 200° C. at atmospheric pressure.

2. A process for reductive coupling of vinyl aromatic compounds which comprises reacting a vinyl aromatic compound having the formula

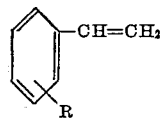

where R is selected from the group consisting of a hydrogen atom, an aryl group, or an alkyl group having from 1 to 12 carbon atoms, in the presence of an alkali metal in an ether at a temperature between 60° and 200° C., said ether having a boiling point between 60° and 200° C. at atmospheric pressure.

3. A process for the reductive coupling of styrene which comprises reacting styrene with an alkali metal, at a temperature between 60° and 200° C., in the presence of an ether, said ether having a boiling point between 60° and 200° C. at atmospheric pressure.

4. A process according to that described in claim 3 wherein the alkali metal is sodium.

5. A process according to that described in claim 3 wherein the sodium is employed as a dispersion having an average particle size not greater than 50 microns.

6. A process for the preparation of diphenylbutanes which comprises the steps of coupling styrene in the presence of sodium in an ether boiling at a temperature between 60° and 200° C. at atmospheric pressure to form the diphenylbutanes and thereafter separating the mixture of diphenylbutanes formed from said ether.

7. A process for the preparation of 1,4-diphenylbutane which comprises the steps of coupling styrene in the presence of sodium in an ether boiling at a temperature between 60° and 200° C. at atmospheric pressure to form a mixture of 1,4-diphenylbutane and 1,3-diphenylbutane and thereafter separating 1,4-diphenylbutane from said mixture.

8. A method of coupling a vinyl aromatic compound with itself which comprises a body of an ether-containing reaction medium containing suspended particulate alkali metal at a temperature between 60° and 200° C. and adding said vinyl aromatic compound thereto so that the amount of alkali metal present at any time is at least an equimolar amount based on the vinyl aromatic compound present and the mole ratio of vinyl aromatic compound to ether is not greater than 1 to 1.

9. The process of claim 8 in which the alkali metal is sodium.

10. The process of claim 8 in which the vinyl aromatic compound is styrene.

References Cited in the file of this patent

UNITED STATES PATENTS

| 2,761,886 | Frank et al. | Sept. 4, 1956 |
| 2,773,092 | Carley et al. | Dec. 4, 1956 |
| 2,816,913 | Frank et al. | Dec. 17, 1957 |
| 2,816,916 | Frank et al. | Dec. 17, 1957 |